(12) United States Patent
Jain et al.

(10) Patent No.: US 9,497,287 B2
(45) Date of Patent: *Nov. 15, 2016

(54) EXCHANGING A CONTACT PROFILE BETWEEN CLIENT DEVICES DURING A COMMUNICATION SESSION

(71) Applicant: QUALCOMM Incorporated, San Diego, CA (US)

(72) Inventors: Nikhil Jain, San Diego, CA (US); Ram Krishnan, San Diego, CA (US); Jose Roberto Menendez, Encinitas, CA (US); Gerald Patrick Joyce, III, San Diego, CA (US); Manoj Deshpande, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/832,198

(22) Filed: Aug. 21, 2015

(65) Prior Publication Data
US 2015/0358808 A1 Dec. 10, 2015

Related U.S. Application Data

(63) Continuation of application No. 13/794,511, filed on Mar. 11, 2013, now Pat. No. 9,148,489.

(51) Int. Cl.
*H04L 1/00* (2006.01)
*H04L 29/08* (2006.01)
(Continued)

(52) U.S. Cl.
CPC .......... *H04L 67/306* (2013.01); *H04L 61/308* (2013.01); *H04L 61/605* (2013.01); *H04L 65/1069* (2013.01); *H04L 65/1083* (2013.01); *H04L 67/1095* (2013.01); *H04W 8/20* (2013.01)

(58) Field of Classification Search
CPC .......... H04L 65/1068; H04L 65/1083; H04L 67/306; H04W 8/20
USPC ........ 370/229, 331, 328; 455/415, 461, 458, 455/456.1, 456.3, 418
See application file for complete search history.

(56) References Cited

U.S. PATENT DOCUMENTS

| | | | |
|---|---|---|---|
| 6,564,261 | B1 | 5/2003 | Gudjonsson et al. |
| 7,171,190 | B2 | 1/2007 | Ye et al. |

(Continued)

FOREIGN PATENT DOCUMENTS

| | | |
|---|---|---|
| CN | 101278545 A | 10/2008 |
| CN | 101702795 A | 5/2010 |

(Continued)

OTHER PUBLICATIONS

Guenkova-Luy T., et al., "Service Mobility with SIP, SOP and MPEG-21", Telecommunications, 2007, Contel 2007, 9th International Conference On, IEEE, PI, Jun. 1, 2007, pp. 293-300, XP031113737, ISBN: 978-953-184-110-8 p. 294-p. 299.

(Continued)

*Primary Examiner* — Dady Chery
(74) *Attorney, Agent, or Firm* — The Marbury Law Group, PLLC

(57) ABSTRACT

In an embodiment, a client device (CD) maintains a contact profile for a user of the CD, the contact profile including a universal identifier (UID) for the user and a list of devices and addresses at which the user of the CD can be contacted. The CD establishes a communication session with a remote CD (RCD) via a given contact address from the set of contact addresses for the RCD. The CD shares, in response to the communication session establishment, at least a portion of the contact profile to the RCD. The RCD generates and/or updates a given contact profile for the user of the CD that is maintained on the RCD based on the shared contact profile. The RCD can also share its profile with the CD in response to the communication session establishment, causing the CD to generate and/or update a contact profile for the RCD.

30 Claims, 9 Drawing Sheets

(51) Int. Cl.
  *H04L 29/12* (2006.01)
  *H04W 8/20* (2009.01)
  *H04L 29/06* (2006.01)

(56) References Cited

U.S. PATENT DOCUMENTS

| | | |
|---|---|---|
| 7,881,656 B2 | 2/2011 | Khedouri et al. |
| 8,099,343 B1 | 1/2012 | O'Neil et al. |
| 8,369,832 B2 | 2/2013 | Thalapaneni et al. |
| 2004/0081088 A1 | 4/2004 | Schinner et al. |
| 2004/0143671 A1 | 7/2004 | Idnani |
| 2005/0113079 A1 | 5/2005 | Guo |
| 2006/0088149 A1 | 4/2006 | Sung |
| 2007/0121606 A1 | 5/2007 | Scheinert |
| 2007/0121879 A1 | 5/2007 | McGary et al. |
| 2007/0162971 A1 | 7/2007 | Blom et al. |
| 2007/0296805 A1 | 12/2007 | Tedenvall et al. |
| 2008/0013712 A1 | 1/2008 | Gopinath |
| 2008/0059627 A1 | 3/2008 | Hamalainen et al. |
| 2008/0123683 A1 | 5/2008 | Cheng et al. |
| 2009/0011743 A1 | 1/2009 | Johanson et al. |
| 2009/0103707 A1 | 4/2009 | McGary et al. |
| 2009/0143056 A1 | 6/2009 | Tang et al. |
| 2010/0015976 A1 | 1/2010 | Issa et al. |
| 2010/0088430 A1 | 4/2010 | Ton et al. |
| 2010/0215037 A1 | 8/2010 | Long et al. |
| 2010/0317322 A1 | 12/2010 | Underwood et al. |
| 2011/0164106 A1 | 7/2011 | Kim |
| 2011/0243141 A1 | 10/2011 | Blackburn et al. |
| 2011/0258159 A1 | 10/2011 | Mitchell |
| 2012/0081502 A1 | 4/2012 | Naidu et al. |
| 2012/0144305 A1 | 6/2012 | Bekiares et al. |
| 2012/0225652 A1 | 9/2012 | Martinez et al. |
| 2013/0041954 A1 | 2/2013 | Kim et al. |
| 2013/0174237 A1 | 7/2013 | Zises |
| 2013/0339464 A1 | 12/2013 | Goudarzi et al. |
| 2014/0254434 A1 | 9/2014 | Jain et al. |
| 2014/0269497 A1 | 9/2014 | Jain et al. |
| 2014/0280706 A1 | 9/2014 | Jain et al. |

FOREIGN PATENT DOCUMENTS

| | | |
|---|---|---|
| EP | 1965567 A1 | 9/2008 |
| JP | 2006094379 A | 4/2006 |
| JP | 2012120041 A | 6/2012 |
| KR | 20070078340 A | 7/2007 |
| WO | WO-2011129984 | 10/2011 |
| WO | 2012009886 A1 | 1/2012 |
| WO | 2012087680 A1 | 6/2012 |

OTHER PUBLICATIONS

International Search Report and Written Opinion—PCT/US2014/021987—ISA/EPO—Jul. 28, 2014.

Ohta K., et al., "Adaptive terminal middleware for session mobility", Multimedia Signal Processing, 2002 IEEE Workshop on Dec. 9-11, 2002, Piscataway, NJ, USA, IEEE, May 19, 2003, pp. 394-399, XP010642403, ISBN: 978-0-7803-7713-4 p. 394-p. 396.

Shacham R., et al., "Session Initiation Protocol (SIP) Session Mobility; rfc.5631.txt", Session Initiation Protocol (SIP) Session Mobility; RFC5631.TXT, Internet Engineering Task Force, IETF; Standard, Internet Society (ISOC) 4, Rue Desfalaises CH—1205 Geneva, Switzerland, Oct. 1, 2009, 18 Pages, XP015065702, [retrieved on Oct. 22, 2009] p. 4-p. 11.

Shacham R., et al., "Ubiquitous Device Personalization and Use: The Next Generation of IP Multimedia Communications", ACM Transactions on Multimedia Computing Communications Andapplications, Association for Computing Machinery, US, vol. 3, No. 2, May 1, 2007, pp. 1-20, XP007907295, ISSN: 1551-6857, DOI: 10.1145/1230812.1230818 p. 2-p. 13.

BUILDING CONTACT PROFILE FOR USER

*VOICEMAIL / MESSAGE AGGREGATION*

*NO VOICEMAIL / MESSAGE AGGREGATION CONVENTIONAL ART*

*WITH VOICEMAIL / MESSAGE AGGREGATION*

*SHARING CONTACT PROFILE BETWEEN CLIENT DEVICES DURING COMMUNICATION SESSION*

RETRIEVING CONTACT PROFILE FROM SERVER

*SETTING UP COMMUNICATION*
*SESSION USING CONTACT PROFILE*

EXCHANGING A CONTACT PROFILE BETWEEN CLIENT DEVICES DURING A COMMUNICATION SESSION

RELATED APPLICATIONS

This application is a continuation of U.S. patent application Ser. No. 13/794,511 entitled "Exchanging a Contact Profile Between Client Devices During a Communication Session" filed Mar. 11, 2013, the entire contents of which are incorporated herein by reference.

BACKGROUND OF THE INVENTION

1. Field of the Invention

Embodiments of the invention relate to sharing a contact profile between client devices during a communication session.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data, Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

It is typical for client devices (e.g., mobile devices such as cell phones) that use the above-noted communication systems or other types of access networks (e.g., WiFi, etc.) to maintain a set of contact profiles in a contact book. Each contact profile can be associated with a particular contact (e.g., a friend, a family member, etc.) and each contact profile can include a variety of contact addresses that use different contact mechanisms for reaching the particular contact. For example, a given contact profile can include, for a single contact, a cellular phone number, a home phone number, an email, VoIP IDs (e.g., a Skype ID), a Google Voice ID, an IMS ID for presence and VoIP calls using IMS servers, and so on. However, these contact profiles generally require manual effort to be generated and maintained (e.g., the user must physically input each contact address into the contact profile for a particular contact). Also, while a client device may permit a contact address of a contact to be appended to an existing contact profile after the client device communicates with the contact over that contact address, it can be difficult to add new contact addresses to contact profiles if those contact addresses have not yet actually interfaced with the client device.

SUMMARY

In an embodiment, a client device (CD) maintains a contact profile for a user of the CD, the contact profile including a universal identifier (UID) for the user and a list of devices and addresses at which the user of the CD can be contacted. The CD establishes a communication session with a remote CD (RCD) via a given contact address from the set of contact addresses for the RCD. The CD shares, in response to the communication session establishment, at least a portion of the contact profile to the RCD. The RCD generates and/or updates a given contact profile for the user of the CD that is maintained on the RCD based on the shared contact profile. The RCD can also share its profile with the CD in response to the communication session establishment, causing the CD to generate and/or update a contact profile for the RCD.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
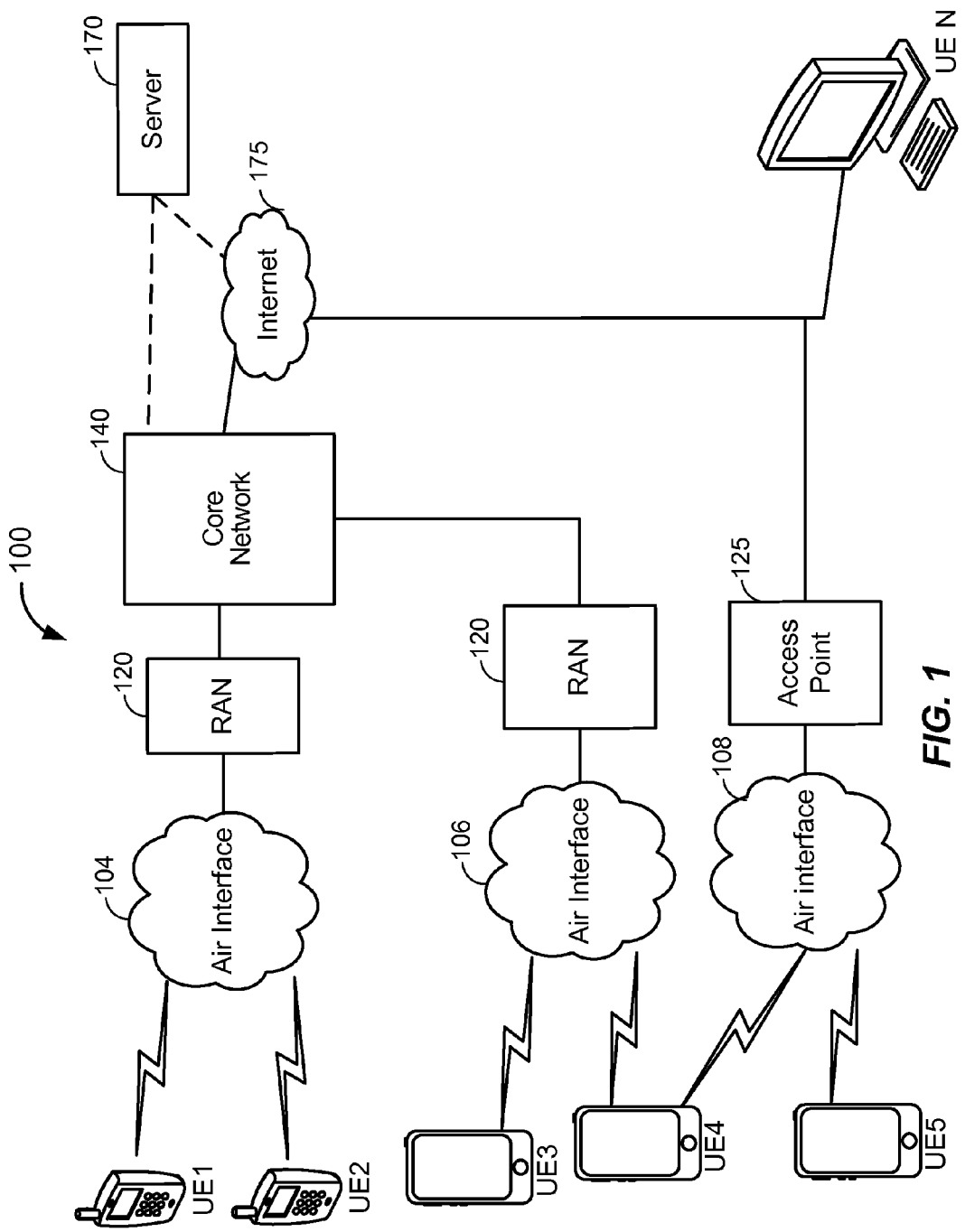
FIG. 1 illustrates a high-level system architecture of a wireless communications system in accordance with an embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the invention. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, a server 170 is shown as connected to the Internet 175, the core network 140, or both. The server 170 can be implemented as a plurality of structurally separate servers, or alternately may correspond to a single server. As will be described below in more detail, the server 170 is configured to support one or more communication services (e.g., Voice-over-Internet Protocol (VoIP) sessions, Push-to-Talk (PTT) sessions, group communication sessions, social networking services, etc.) for UEs that can connect to the server 170 via the core network 140 and/or the Internet 175, and/or to provide content (e.g., web page downloads) to the UEs.

Figure 2:
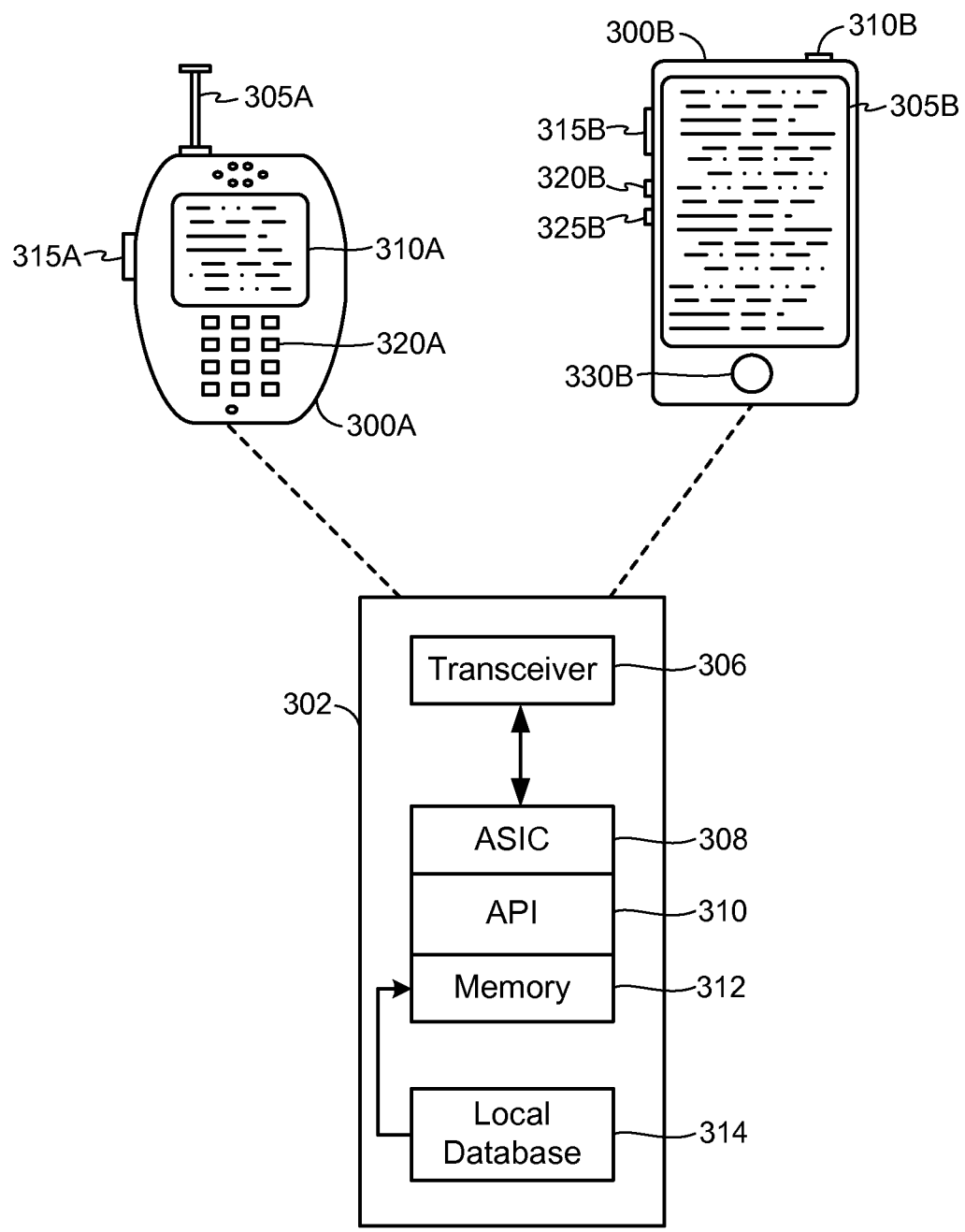
FIG. 2 illustrates examples of user equipments (UEs) in accordance with embodiments of the invention.

FIG. 2 illustrates examples of UEs (i.e., client devices) in accordance with embodiments of the invention. Referring to FIG. 2, UE 300A is illustrated as a calling telephone and UE 300B is illustrated as a touchscreen device (e.g., a smart phone, a tablet computer, etc.). As shown in FIG. 2, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to WiFi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 2. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only or random-access memory (RAM and ROM), EEPROM, flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 2 are to be considered merely illustrative and the invention is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 3:
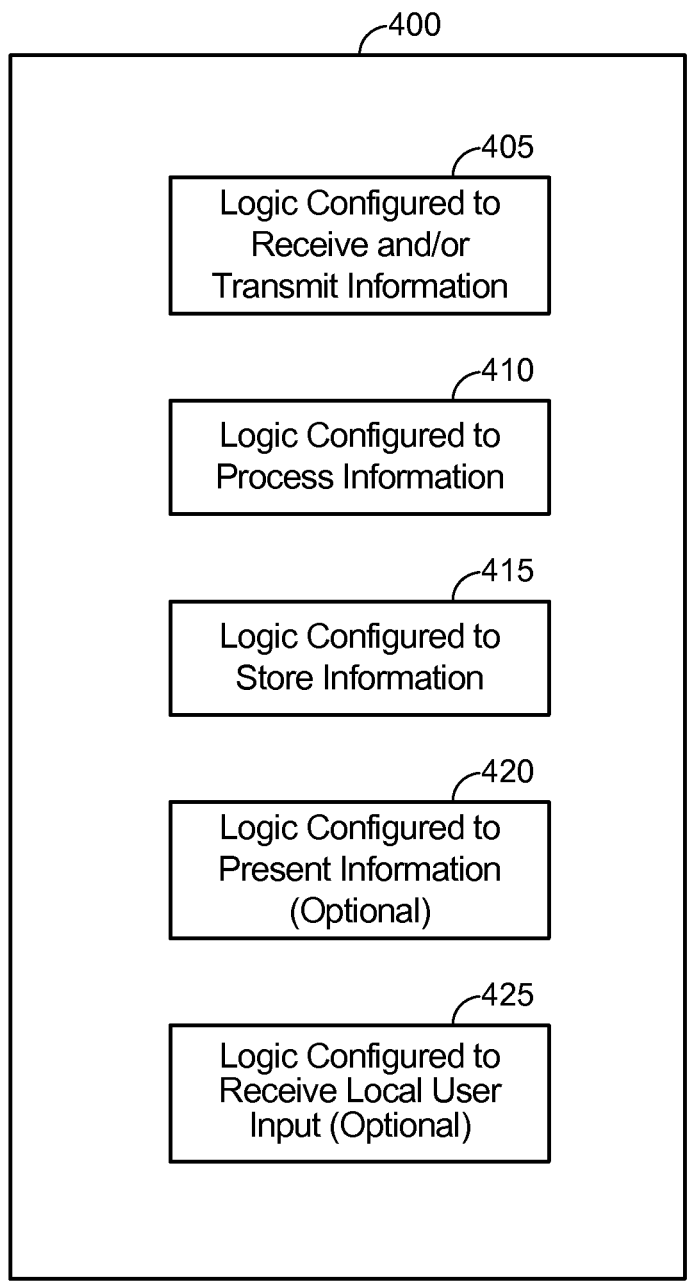
FIG. 3 illustrates a communication device that includes logic configured to perform functionality in accordance with an embodiment of the invention.

FIG. 3 illustrates a communication device 400 that includes logic configured to perform functionality. The communication device 400 can correspond to any of the above-noted communication devices, including but not limited to UEs 300A or 300B, any component of the RAN 120, any component of the core network 140, any components coupled with the core network 140 and/or the Internet 175 (e.g., the server 170), and so on. Thus, communication device 400 can correspond to any electronic device that is configured to communicate with (or facilitate communication with) one or more other entities over the wireless communications system 100 of FIG. 1.

Referring to FIG. 3, the communication device 400 includes logic configured to receive and/or transmit information 405. In an example, if the communication device 400 corresponds to a wireless communications device (e.g., UE 300A or 300B, AP 125, a BS, Node B or eNodeB in the RAN 120, etc.), the logic configured to receive and/or transmit information 405 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., server 170, etc.), the logic configured to receive and/or transmit information 405 can correspond to an Ethernet card, in an example, that connects the network-based server to other communication entities via an Ethernet protocol. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 3, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, the processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 3, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 3, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 2, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers such as the server 170, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 3, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 2, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers such as the server 170, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 3, while the configured logics of 405 through 425 are shown as separate or distinct blocks in FIG. 3, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 4:
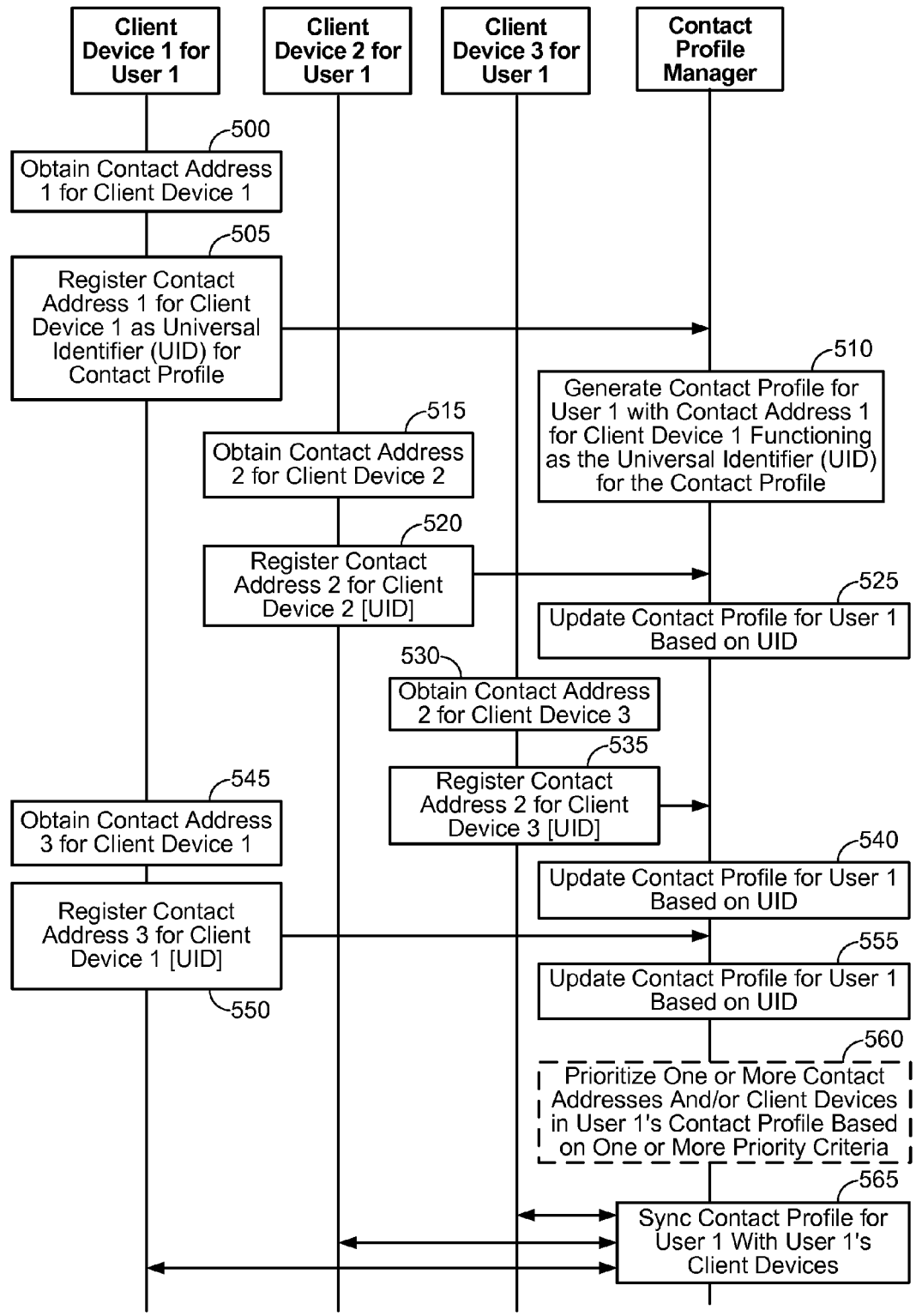
FIG. 4 illustrates a process of building a contact profile in accordance with an embodiment of the invention.

FIG. 4 illustrates a process of building a contact profile in accordance with an embodiment of the invention. FIG. 4 is described with respect to a contact profile manager that generates, updates and distributes the contact profile to client devices (e.g., such as UE 305A or 305B, which can be implemented as cellular phones, tablet computers, desktop or laptop computers, etc.) that are owned or operated by a given user ("user 1"). The contact profile manager is an application that can reside either on one of user 1's client devices, or alternatively at a server (e.g., such as server 170 from FIG. 1).

Referring to FIG. 4, a first client device ("client device 1") for user 1 obtains a first contact address ("contact address 1") that is associated with a first communication service for user 1, 500. For example, contact address 1 can correspond to a cellular telephone number for a cellular telephone service. Generally, contact address 1 will correspond to any contact address that is unlikely to change over time so that contact address 1 can be used as a universal identifier (UID)

for the associated contact profile, which can include multiple contact addresses across different client devices or the same client device.

After obtaining contact address 1 for client device 1, client device 1 registers (e.g., via an API for interacting with the contact profile manager that executes on client device 1), with the contact profile manager, contact address 1 for client device 1 as a UID for user 1's contact profile, 505. The contact profile manager then generates the contact profile for user 1 with contact address 1 as the UID, 510, as shown in Table 1 (below):

TABLE 1

| Contact Profile for User 1: UID = Contact Address 1 |
| --- |
| Contact Address 1 @ Client Device 1 |

| | |
| --- | --- |
| Device ID | Cellular Telephone |
| Contact Address | 1-333-444-5555 [Cellular Telephone Number] |
| Device Location Descriptor | Mobile |
| Presence | Online |
| Contact Mechanisms | SMS; Voice Calls; Video Calls |
| Preferred Contact Mechanism | SMS |

In Table 1 (above), contact address 1 on client device 1 corresponds to a cellular phone number of 1-333-444-5555, a device ID or type for client device 1 is a cellular telephone, a device location descriptor is mobile, a presence status for contact address 1 on client device 1 is set to online, which implies that user 1 is expected to currently be reachable via contact address 1 on client device 1. For certain contact mechanisms (e.g., circuit-switched voice calls to/from cellular telephones), an associated client device's online status is known at the network but not to other client devices. Thus, these other client devices will typically presume the associated client device to be online (e.g., unlike a contact mechanism such as Skype, where users log into a Skype server to register their online presence). In the example of circuit-switched voice calling contact mechanism with online presumption, the online presumption is typically rebutted only when a call is made to a target client device and that target client device is unavailable (e.g., the caller is routed to a voicemail service for the called party). Thus, the presence status being "online" in Table 1 (and in the Tables described below) can correspond to either a presumptive online status or an actual online status (e.g., based on presence real-time information). Also, available contact mechanisms (or communication services) for contact address 1 include SMS, voice calls and video calls, with SMS being the preferred contact mechanism for user 1 over contact address 1 on client device 1 (e.g., as will be described below in more detail, the contact mechanism preference can be set by the service provider or carrier, by user 1, etc.).

At some later point in time, a second client device ("client device 2") for user 1 obtains a second contact address ("contact address 2") that is associated with a second communication service for user 1, 515. For example, contact address 2 can correspond to a Skype ID for a Skype VoIP service, etc. After obtaining contact address 2 for client device 2, client device 2 registers (e.g., via an API for interacting with the contact profile manager that executes on client device 2), with the contact profile manager, contact address 2 for client device 2 using the UID for user 1's contact profile, 520. Thus, the contact profile manager is capable of associating user 1's contact profile with the new registration for contact address 2 on client device 2 based on the UID. The contact profile manager then updates the contact profile for user 1 with contact address 2, 525, as shown in Table 2 (below):

TABLE 2

| Contact Profile for User 1: UID = Contact Address 1 |
| --- |
| Contact Address 1 @ Client Device 1 |

| | |
| --- | --- |
| Device ID | Cellular Telephone |
| Contact Address | 1-333-444-5555 [Cellular Telephone Number] |
| Device Location Descriptor | Mobile |
| Presence | Online |
| Contact Mechanisms | SMS; Voice Calls; Video Calls |
| Preferred Contact Mechanism | SMS |

| Contact Address 2 @ Client Device 2 |
| --- |

| | |
| --- | --- |
| Device ID | Tablet Computer |
| Contact Address | JohnDoe1890 [SkypeID] |
| Device Location Descriptor | Home |
| Presence | Online |
| Contact Mechanisms | VoIP calls; Video Calls |
| Preferred Contact Mechanism | VoIP calls |

In Table 2 (above), contact address 2 on client device 2 corresponds to a SkypeID of JohnDoe1890, a device ID or type for client device 2 is a tablet computer, a device location descriptor is home, a presence status for contact address 2 on client device 2 is set to online, which implies that user 2 is expected to currently be reachable via contact address 2 on client device 2. Also, available contact mechanisms (or communication services) for contact address 2 include VoIP calls or video calls, with voice calls being the preferred contact mechanism for user 1 over contact address 2 on client device 2 (e.g., as will be described below in more detail, the contact mechanism preference can be set by the service provider or carrier, by user 1, etc.).

At some later point in time, a third client device ("client device 3") for user 1 obtains contact address 2 (which is associated with the same second communication service for user 1 as contact address 2 on client device 2), 530. For example, contact address 2 can correspond to a Skype ID for a Skype VoIP service, and client devices 2 and 3 can each install a Skype client application to which user 1 has logged on. After obtaining contact address 2 for client device 3, client device 3 registers (e.g., via an API for interacting with the contact profile manager that executes on client device 3), with the contact profile manager, contact address 2 for client device 3 using the UID for user 1's contact profile, 535. Thus, the contact profile manager is capable of associating user 1's contact profile with the new registration for contact address 2 on client device 3 based on the UID. The contact profile manager then updates the contact profile for user 1 with contact address 2 on client device 3, 540, as shown in Table 3 (below):

TABLE 3

| Contact Profile for User 1: UID = Contact Address 1 |
| --- |
| Contact Address 1 @ Client Device 1 |

| | |
| --- | --- |
| Device ID | Cellular Telephone |
| Contact Address | 1-333-444-5555 [Cellular Telephone Number] |
| Device Location Descriptor | Mobile |
| Presence | Online |

TABLE 3-continued

Contact Profile for User 1: UID = Contact Address 1

| | |
|---|---|
| Contact Mechanisms | SMS; Voice Calls; Video Calls |
| Preferred Contact Mechanism | SMS |
| Contact Address 2 @ Client Device 2 | |
| Device ID | Tablet Computer |
| Contact Address | JohnDoe1890 [SkypeID] |
| Device Location Descriptor | Home |
| Presence | Offline |
| Contact Mechanisms | VoIP calls; Video Calls |
| Preferred Contact Mechanism | VoIP calls |
| Contact Address 2 @ Client Device 3 | |
| Device ID | Desktop Computer |
| Contact Address | JohnDoe1890 [SkypeID] |
| Device Location Descriptor | Work |
| Presence | Online |
| Contact Mechanisms | VoIP calls; Video Calls |
| Preferred Contact Mechanism | Video calls |

In Table 3 (above), contact address 2 on client device 3 corresponds to the SkypeID of JohnDoe1890, similar to contact address 2 on client device 2. However, unlike contact address 2 on client device 2, contact address 2 on client device 3 has a device ID or type that corresponds to a desktop computer, a device location descriptor is work, a presence status for contact address 2 on client device 2 is set to online, which implies that user 2 is expected to currently be reachable via contact address 2 on client device 3. Also, available contact mechanisms (or communication services) for contact address 2 on client device 3 include VoIP calls or video calls, with video calls being the preferred contact mechanism for user 1 over contact address 2 on client device 3 (e.g., as will be described below in more detail, the contact mechanism preference can be set by the service provider or carrier, by user 1, etc.).

At some later point in time, client device 1 for user 1 obtains a third contact address ("contact address 3") associated with a third communication service for user 1, 545. For example, contact address 3 can correspond to a Facebook ID for a Facebook chat service, and client device 1 can install a Facebook client application to which user 1 has logged on. After obtaining contact address 3 for client device 1, client device 1 registers (e.g., via the API for interacting with the contact profile manager that executes on client device 1), with the contact profile manager, contact address 3 for client device 1 using the UID for user 1's contact profile, 550. Thus, the contact profile manager is capable of associating user 1's contact profile with the new registration for contact address 3 on client device 1 based on the UID. The contact profile manager then updates the contact profile for user 1 with contact address 3 on client device 1, 555, as shown in Table 4 (below):

TABLE 4

Contact Profile for User 1: UID = Contact Address 1

| | |
|---|---|
| Contact Address 1 @ Client Device 1 | |
| Device ID | Cellular Telephone |
| Contact Address | 1-333-444-5555 [Cellular Telephone Number] |
| Device Location Descriptor | Mobile |
| Presence | Online |
| Contact Mechanisms | SMS; Voice Calls; Video Calls |
| Preferred Contact Mechanism | SMS |
| Contact Address 3 @ Client Device 1 | |
| Device ID | Cellular Telephone |
| Contact Address | John X. Doe [Facebook ID] |
| Device Location Descriptor | Mobile |
| Presence | Online |
| Contact Mechanisms | Facebook chat |
| Preferred Contact Mechanism | Facebook chat |
| Contact Address 2 @ Client Device 2 | |
| Device ID | Tablet Computer |
| Contact Address | JohnDoe1890 [SkypeID] |
| Device Location Descriptor | Home |
| Presence | Offline |
| Contact Mechanisms | VoIP calls; Video Calls |
| Preferred Contact Mechanism | VoIP calls |
| Contact Address 2 @ Client Device 3 | |
| Device ID | Desktop Computer |
| Contact Address | JohnDoe1890 [SkypeID] |
| Device Location Descriptor | Work |
| Presence | Online |
| Contact Mechanisms | VoIP calls; Video Calls |
| Preferred Contact Mechanism | Video calls |

In Table 4 (above), the device ID and device location descriptor for client device 3 do not change (i.e., cellular telephone and mobile), contact address 3 on client device 1 corresponds to the Facebook ID of John X. Doe, the presence is online, and the only available contact mechanism (and thereby the preferred contact mechanism) for contact address 3 on client device 1 is Facebook chat.

Referring to FIG. 4, the contact profile manager can periodically update the priorities of contact addresses, client devices, or both, 560. For example, contact address 2 on client device 2 may have a higher priority than contact address 2 on client device 3 (e.g., a user wants to be called via his/her home device even if that user is working at home with a separate work device). In another example, user 1 may want to limit his/her data usage on client device 1 (e.g., due to an expensive cellular data plan), and may thereby prefer to be contacted on any other client device with an online presence indicator before a contact attempt is made at client device 1 (over any contact address). Also, the contact profile manager can periodically sync user 1's contact profile across user 1's various client devices, 565. As will be described below in more detail, the contact profile syncing of 565 can help to ensure that each client device is up-to-date with respect to user 1's list of contact addresses, client devices, presence information, etc., and this information can be shared with other entities over a client-to-client (or peer-to-peer) exchange during a communication session over any of user 1's contact addresses.

Referring to FIG. 4, the prioritization of the contact addresses at 560 can be configured in a number of different ways. For example, the priorities of one or more of the contact addresses in user 1's contact profile can be based on service provider or carrier preference. For example if the service provider has agreements with Skype to prioritize calls over Skype when available, Skype IDs in user 1's contact profile can be allocated a higher priority as compared to other contact mechanisms (e.g., Google Talk, voice dialing, etc.). In another example, geographic location can be used to determine the priorities for one or more of the contact address. For example in dense urban areas with seamless Wi-Fi availability, VoIP applications may be allocated higher priority and in other areas circuit-switched voice may have higher priority. Thus, the geographic locations of certain client devices in user 1's contact profile can affect the priority of particular contact addresses registered to those particular client devices. Also, depending on regional contracts and advertisement revenues, the service provider may set priorities based on geographic location as well. In another example, the priorities of one or more of the contact addresses in user 1's contact profile can be based upon user preferences specific to user 1. In yet another example, one or more of the contact addresses in user 1's contact profile may be allocated priorities that are specific to particular targets (or groups of contacts). For example, a higher priority can be allocated to circuit-switched voice calls for important work customers despite the higher expense of circuit-switched voice calls, whereas higher priority can be allocated to cheaper VoIP calls for certain family members, etc.

Figure 5:
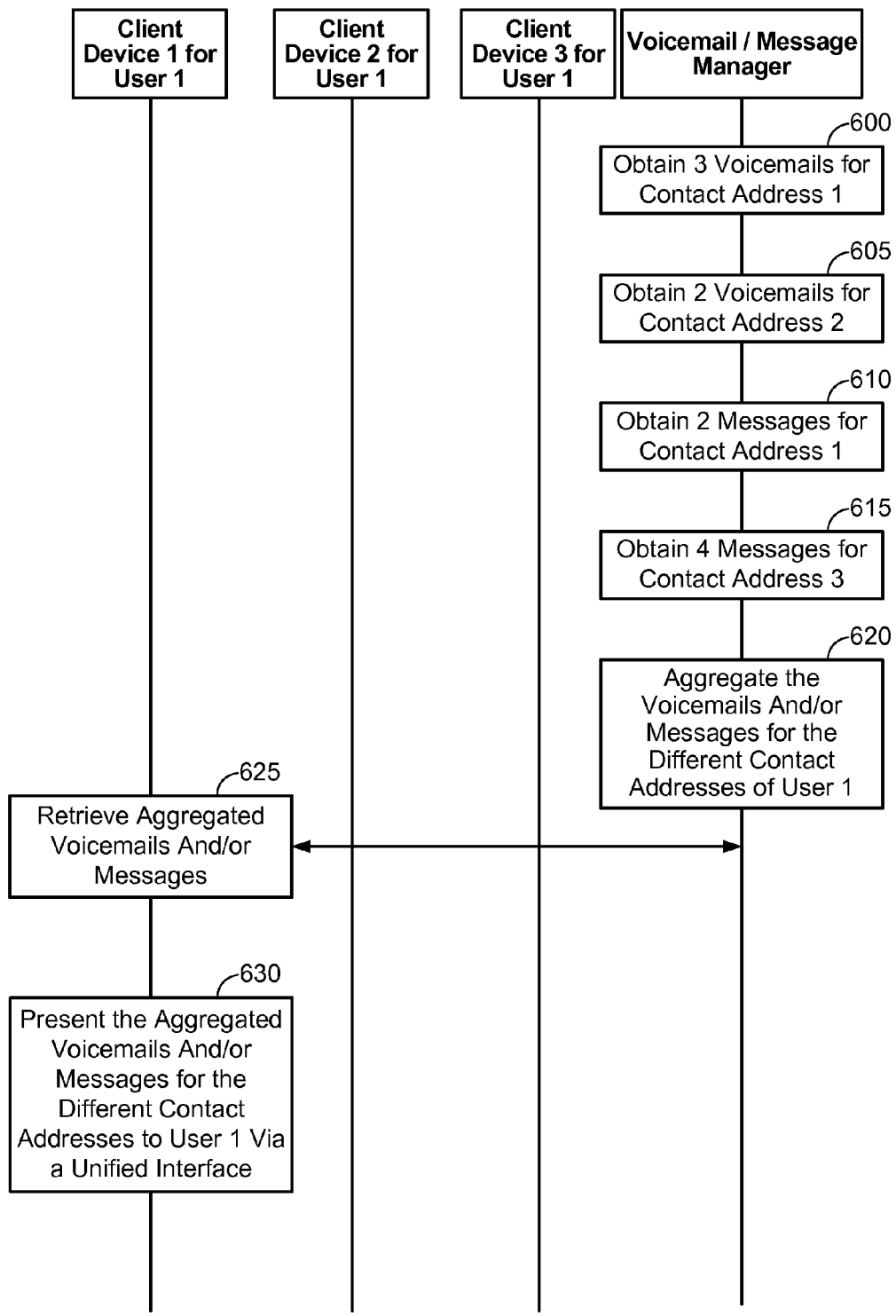
FIG. 5 illustrates a process of aggregation message information for different communication services in accordance with an embodiment of the invention.

While FIG. 4 relates to an aggregation of contact information for a particular user within a contact profile, FIG. 5 illustrates a process of aggregation message information for different communication services in accordance with an embodiment of the invention. FIG. 5 is described with respect to a voicemail/message manager that collects and aggregates messages and/or voicemails for a variety of communication services (e.g., VoIP, Facebook, Skype, circuit-switched voice calls, SMS, etc.) associated with user 1. Similar to the contact profile manager of FIG. 4, the voicemail/message manager is an application that can reside either on one of user 1's client devices, or alternatively at a server (e.g., such as server 170 from FIG. 1).

Referring to FIG. 5, the voicemail/message manager obtains three (3) voicemails for contact address 1, 600 (e.g., via phone call attempts to client device 1), two (2) voicemails for contact address 2, 605 (e.g., via Skype, in conjunction with attempts to call user 1's SkypeID on client device 2 or client device 3), two (2) text or SMS messages for contact address 1, 610 and four (4) text messages for contact address 3, 615 (e.g., Facebook chat messages sent to user 1's Facebook account). The voicemails and/or messages collected by the voicemail/message manager between 600 through 615 can either be directed to specific client devices or can be client device independent. The voicemail/message manager aggregates the voicemails and/or the messages collected between 600 through 615, 620. The aggregation of 620 can be aligned by message type (e.g., aggregate all text-related messages into one aggregation group, aggregate all voice-related messages into another aggregation group), by client device (e.g., aggregate all messages of any type for each particular client device separately), by group of people (e.g., aggregate all messages from work contacts separately, aggregated all messages from family contacts separately, aggregate all messages from friend contacts separately, etc.), by time (e.g., aggregate all messages received in a certain block of time, such as during work-hours or on a particular day, etc.), by content (e.g., aggregate work-related message separately from personal messages, whereby the work-related or personal message characterizations can be based either on when the messages were received, the content of the messages and/or the sender of the messages) or the aggregation of 620 can aggregate all the collected voicemails and/or messages without any filtering rules. At 625, client device 1 retrieves the aggregated voicemails and/or messages from the voicemail/message manager, and client device 1 presents the aggregated voicemails and/or messages for the various contact addresses and/or client devices of user 1 via a unified interface, 630. As will be appreciated, if the voicemail/message manager resides on client device 1 (instead of on another of user 1's client devices or a server), the retrieval operation of 625 can be performed at the client device 1 as a local operation.

Figure 6A:
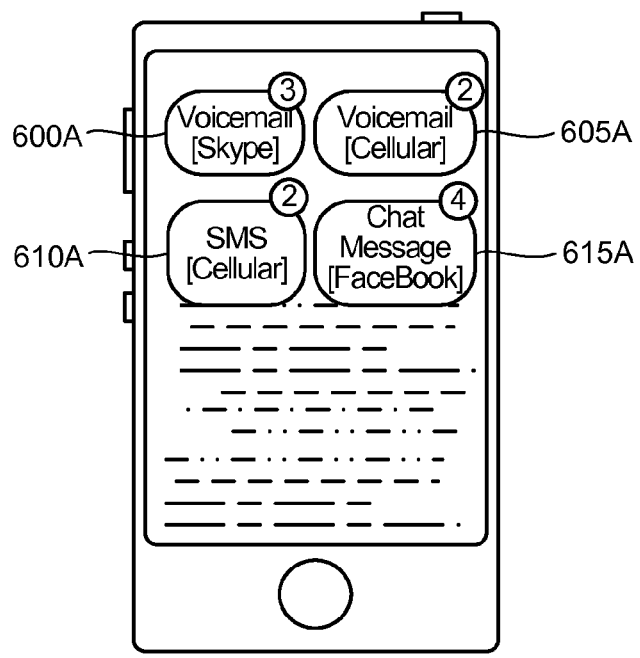
FIG. 6A illustrates an example of conventional voicemail and/or message notifications on a home screen of a conventional client device.
Figure 6B:
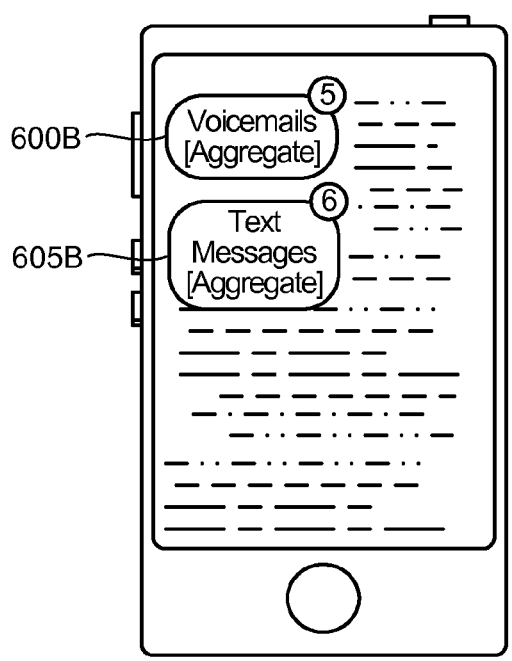
FIG. 6B illustrates an example of aggregated voicemail and/or message notifications on a home screen of a client device in accordance with an embodiment of the present invention.

To help explain the type of voicemail and/or message aggregation that can occur during FIG. 5, FIG. 6A illustrates an example of conventional voicemail and/or message notifications on a home screen of a conventional client device, and FIG. 6B illustrates an example of aggregated voicemail and/or message notifications on a home screen of a client device in accordance with an embodiment of the present invention.

In FIG. 6A, the client device has icons representing a Skype service 600A, a cellular phone service 605A, a cellular SMS or text service 610A and a Facebook chat service 615A. In association with each icon is a number that notifies a user of the client device with regard to how many messages are available for each associated service. Thus, in FIG. 6A, the user has three (3) Skype voicemails, two (2) cellular phone voicemails, two (2) SMS messages and four (4) Facebook chat messages.

In FIG. 6B, an example is provided where the respective messages from FIG. 6A are aggregated using the process of FIG. 5 based on their respective message types (e.g., text or voice). Thus, an icon 600B shows an aggregated set of five (5) voicemails, which consist of the 3 Skype voicemails and 2 cellular phone voicemails from FIG. 6A. Also, an icon 605B shows an aggregated set of six (6) text messages, which consist of the 2 SMS messages and 4 Facebook chat messages from FIG. 6A. As will be appreciated, aggregating voicemails and/or text messages across different services can simplify voicemail and/or text message management for users that use different services on a single client device.

Figure 7:
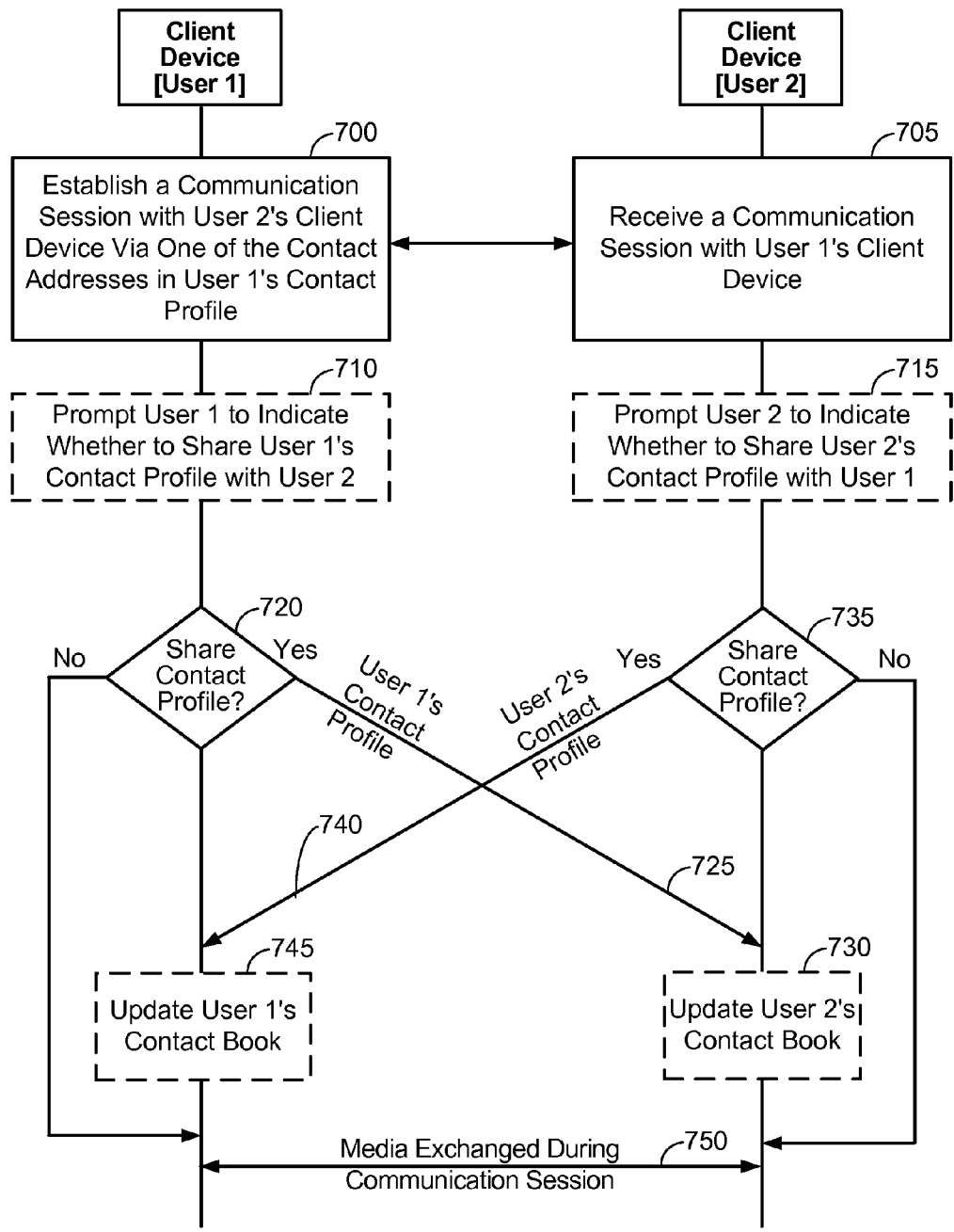
FIG. 7 illustrates a process of sharing a contact profile between client devices operated by different users in accordance with an embodiment of the invention.

FIG. 7 illustrates a process of sharing a contact profile between client devices operated by different users in accordance with an embodiment of the invention. Referring to FIG. 7, a first client device operated by user 1 and a second client device operated by user 2 establish a communication session with each other, 700 and 705. More specifically, the communication session established at 700 and 705 occurs over one of a plurality of contact addresses from contact profiles of user 1 and user 2, respectively. For example, user 1 may use a cellular phone number to call user 2 at a VoIP phone number, while user 1 and user 2 each have contact profiles that include other contact mechanisms associated with other contact addresses and/or client devices. In FIG. 7, assume that user 1 via the first client device is the originator of the communication session, and that user 2 via the second client device is the call target of the communication session.

At 710 and 715, users 1 and 2 are optionally prompted by the respective client devices to ascertain whether users 1 and 2 wish to share their respective contact profiles, including at least a portion of the contact address and/or client device information which is unassociated with their current communication session. The prompts of 710 and 715 can be relatively simple (e.g., "SHARE PROFILE? YES/NO"), or can be more sophisticated so as to permit users 1 and 2 to share only certain parts of their respective contact profiles (e.g., "SHARE ENTIRE PROFILE?", "SHARE WORK CONTACT INFORMATION FROM PROFILE?", "SHARE FRIENDS AND FAMILY CONTACT INFORMATION?", the respective users can be prompted to browse their respective contact profiles and manually select which contact information to share, etc.). 710 and 715 are described as optional because, in at least one embodiment, the contact profile sharing can occur automatically (or passively) so that users 1 and 2 are not explicitly asked for permission before at least a portion of their contact information is passed to the other user.

If user 1 indicates that he/she wants to share at least a portion of user 1's contact profile with user 2 in response to the prompt of 710 (or based on an automatic determination of user 1's client device based on preconfigured privacy rules configured by user 1 or other contact profile sharing criteria) at 720, user 1's client device sends the portion of user 1's contact profile to user 2's client device, 725, and user 2's client device generates (or updates) a contact profile for user 1, 730. Thus, 725 and 730 are conditional operations that occur based on whether user 1's client device determines to share user 1's contact profile with user 2. Further, the contact profile update that occurs at 730 can be with respect to a contact book maintained by the operating system (OS) of user 2's client device, or alternatively a contact book maintained by a third party program or client application configured for execution at a higher-layer than the OS on user 2's client device. Otherwise, if user 1 indicates that he/she does not want to share at least a portion of user 1's contact profile with user 2 in response to the prompt of 710 (or based on an automatic determination of user 1's client device based on preconfigured privacy rules configured by user 1 or other contact profile sharing criteria) at 720, the process advances to 750 without user 1's client device sharing his/her contact profile with user 2.

Likewise, if user 2 indicates that he/she wants to share at least a portion of user 2's contact profile with user 1 in response to the prompt of 715 (or based on an automatic determination of user 2's client device based on preconfigured privacy rules configured by user 2 or other contact profile sharing criteria) at 735, user 2's client device sends the portion of user 2's contact profile to user 1's client device, 740, and user 1's client device generates (or updates) a contact profile for user 2, 745. Thus, 740 and 745 are conditional operations that occur based on whether user 2's client device determines to share user 2's contact profile with user 1. Similar to 730, the contact profile update that occurs at 745 can be with respect to a contact book maintained by the OS of user 1's client device, or alternatively a contact book maintained by a third party program or client application configured for execution at a higher-layer than the OS on user 1's client device. Otherwise, if user 2 indicates that he/she does not want to share at least a portion of user 2's contact profile with user 1 in response to the prompt of 715 (or based on an automatic determination of user 2's client device based on preconfigured privacy rules configured by user 2 or other contact profile sharing criteria) at 735, the process advances to 750 without user 2's client device sharing his/her contact profile with user 1.

It will be appreciated that contact profile sharing operations of 720-730 and 735-745 can occur in conjunction with each other, or alternatively that only one (or none) of the respective client devices may determine to share contact profile information. It will be appreciated that the respective contact profile sharing procedures (720-730 and 735-745) can be performed concurrently (e.g., a mutual profile exchange procedure) or in sequential order (e.g., client device 2 shares user 2's profile first, or vice versa) in other embodiments of the invention.

During the contact profile sharing procedures of 720-730 and/or 735-745, the respective client devices can be concurrently engaged in an exchange of media for the communication session that triggered the contact profile sharing procedure, 750. In an example, the exchange of the contact profiles at 725 and/or 740 can correspond to an in-call information exchange that is piggybacked onto the media being exchanged at 750. Alternatively, it is possible that the contact profile exchange(s) at 725 and/or 740 is triggered by the establishment of the communication session while being carried over a channel that is independent of the communication session (e.g., the communication session can be a circuit-switched voice call whereas the respective contact profiles are separately exchanged via email, text message, FTP, etc.).

While not shown explicitly in FIG. 7, one or more of the contact addresses shared between the client devices at 725 and/or 745 can be "masked" so that any masked contact address can be used to initiate communication sessions by the client device receiving the contact profile, but while hiding the masked contact address (at least partially) from being recognizable to the target user operating that client device. This aspect is described in more detail below with respect to 820 of FIG. 8, and 820 from FIG. 8 could also be implemented in conjunction with the contact profile transmissions of 725 and/or 740.

Figure 8:
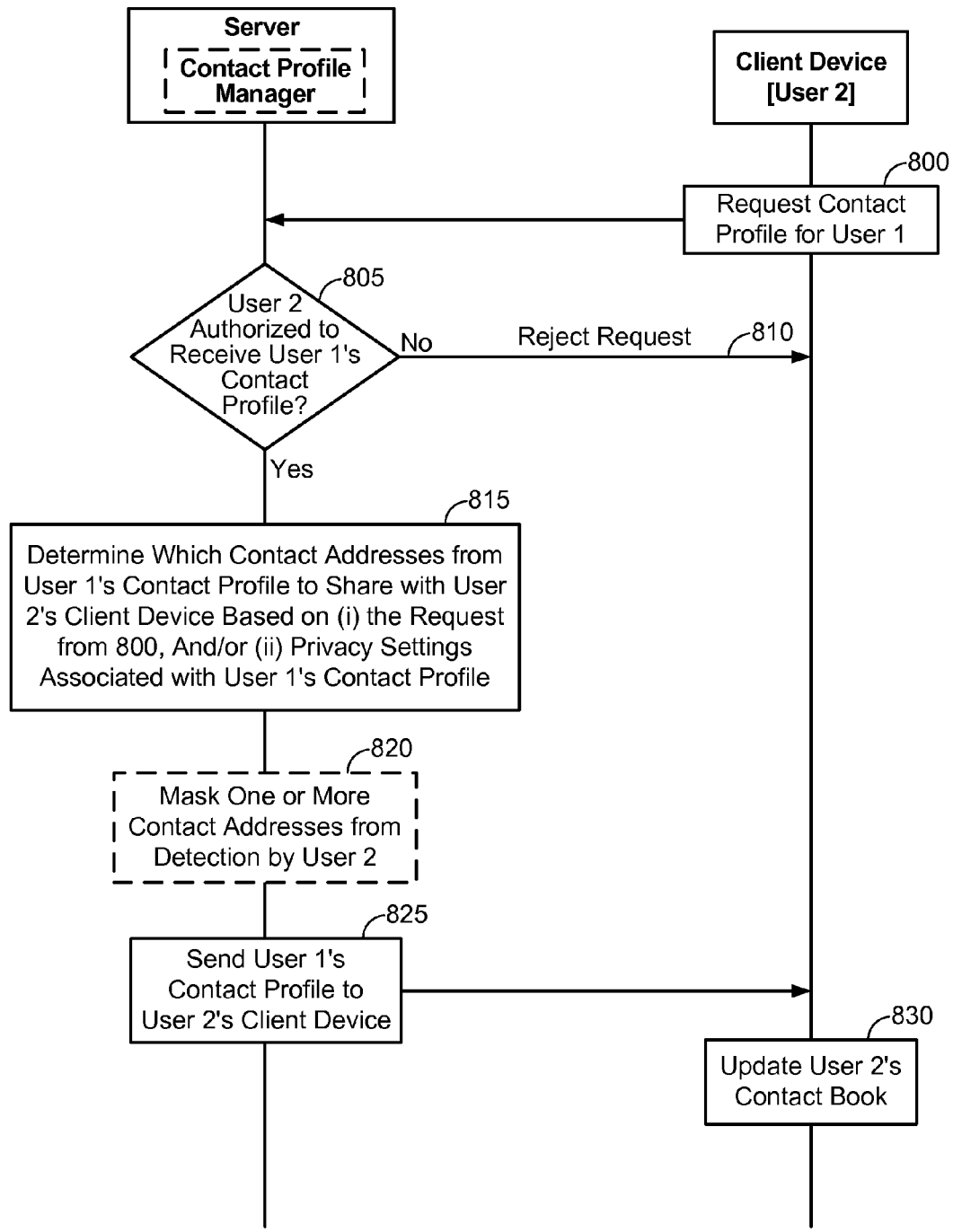
FIG. 8 illustrates a process of retrieving a contact profile from a server in accordance with an embodiment of the invention.

While FIG. 7 is directed to a client-to-client (or peer-to-peer) contact profile exchange procedure, FIG. 8 is directed to a server arbitrated contact profile delivery procedure in accordance with an embodiment of the invention. In the embodiment of FIG. 8, assume that the contact profile manager is implemented at a server, such as server 170 from FIG. 1. At 800, a client device associated with user 2 sends a request for at least a portion of user's 1 contact profile to the contact profile manager. At a minimum, the request of 800 includes the UID for user 1's contact profile (e.g., user 1's cellular phone number). Thus, in an embodiment, user 1's contact profile and any of its associated contact addresses can be looked up by another user via the UID for the contact profile (e.g., user 2 only needs to remember user 1's cellular phone number to look up user 1's other contact addresses via the contact profile manager on the server). The server evaluates the request from user 2 to determine if user 2 is permitted to receive any portion of user 1's contact profile, 805. If not, the request is rejected outright, 810. Otherwise, the server determines which contact addresses from user 1's contact profile to share with user 2's client device based on the request from 800 and/or privacy settings associated with user's 1 contact profile.

Referring to FIG. 8, in an example, the request from 800 may be received at the server in conjunction with a token that indicates the contact profile privileges user 1 wishes to allocate to user 2. The token can be passed to user 2's client device via an earlier text message or email from user 1's client device, in an example. In another example, even if user 2's client device has full access to user 1's contact profile, the request from 800 may not actually be requesting the entirety of user 1's contact profile. Rather, the request from 800 may be configured to simply refresh presence information for user 1's contact book entry in a contact book (e.g., maintained by the associated or by a higher-level client application on user 1's client device) managed by user 2's client device, or to query for new contact addresses with online presence (e.g., so that user 2 can figure out how best to reach user 1, while not caring about currently offline contact addresses), or for landline phone numbers only, or for work-related contact addresses, and so on. Thus, the request itself may function to limit the amount of the contact profile that is ultimately delivered to user 2's client device.

In yet another example, user 1 may configure certain contact addresses with various degrees of privacy. For example, user 1 may have a contact address that corresponds to a landline phone from which user 1 makes phone calls but at which user 1 does not want to receive any return phone calls. In this case, user 1 can ask the contact profile manager not to distribute this phone number to any other users. Alternatively, user 1 may designate that his/her contact addresses are only to be shared with other users (or groups of users) that are already contacts in a contact book of user 1 (e.g., as a friend, a family member, a work colleague, etc.). In another example, user 1 may designate that his/her contact addresses are only to be shared with users in a same category of relationship with user 1 (e.g., work-related contact addresses are shared with users that are work-contacts of user 1 and not with other user types, friend and family-related contact addresses are shared with users that are friend-contacts and/or family-contacts of user 1 and not with other user types, and so on).

In another example, in the case where the same contact address is associated with different client devices, user 1 can restrict some users by client device (not just contact address). Thus, if user 1 has a habit of logging into his/her Skype account on two different client devices, user 1 may want to receive Skype calls from a particular user on one client device but not the other (e.g., one client device may be at home, where the user does not want to receive Skype calls from his/her work colleagues, etc.).

After determining the contact addresses to be shared with user 2's client device at 815, the contact profile manager can optionally mask one or more of these contact addresses from detection by user 2, 820. More specifically, the contact profile manager can mask (or encrypt) these contact addresses so that contact address software on user 2's client device can ascertain the contact address but the user him/herself cannot. For example, a cell phone number for user 1 can be 1-333-444-5555, and this cell phone number can be masked to 1-XXX-XXX-XXXX. Thus, when user's 2 client device presents user 1's contact profile to user 2, this contact address is presented as 1-XXX-XXX-XXXX. If user 2 then selects this contact address to initiate a call with user 1's client device, modem software on user 2's client device can be configured with de-masking or mapping software that will map the masked cell phone number to user 1's actual cell phone number. Accordingly, user 1's contact addresses can become device-specific in the sense that they can be shared with user 2's client device and used by user 2's client device to call user 1, but user 2 cannot simply transfer this contact address to some other device for calling user 1. As will be appreciated, the mask can be implemented at the server (e.g., the server provides the masked contact address along with instructions for the modem software to translate the masked contact address into the actual contact address) or at user 2's client device (e.g., user 2's client device can simply be asked by the server to mask certain contact addresses and the modem software on user 2's client device can then implement its own masking scheme).

Referring to FIG. 8, the contact profile manager sends user 1's contact profile to user 2's client device at 825, and user 2's client device generates and/or updates a contact profile for user 1 in user 2's contact book, 830. As will be appreciated, the contact profile sent at 825 can correspond to user 1's entire profile or designated portions of user 1's profile based on 815, and the contact addresses can either be masked or unmasked based on 820.

Figure 9:
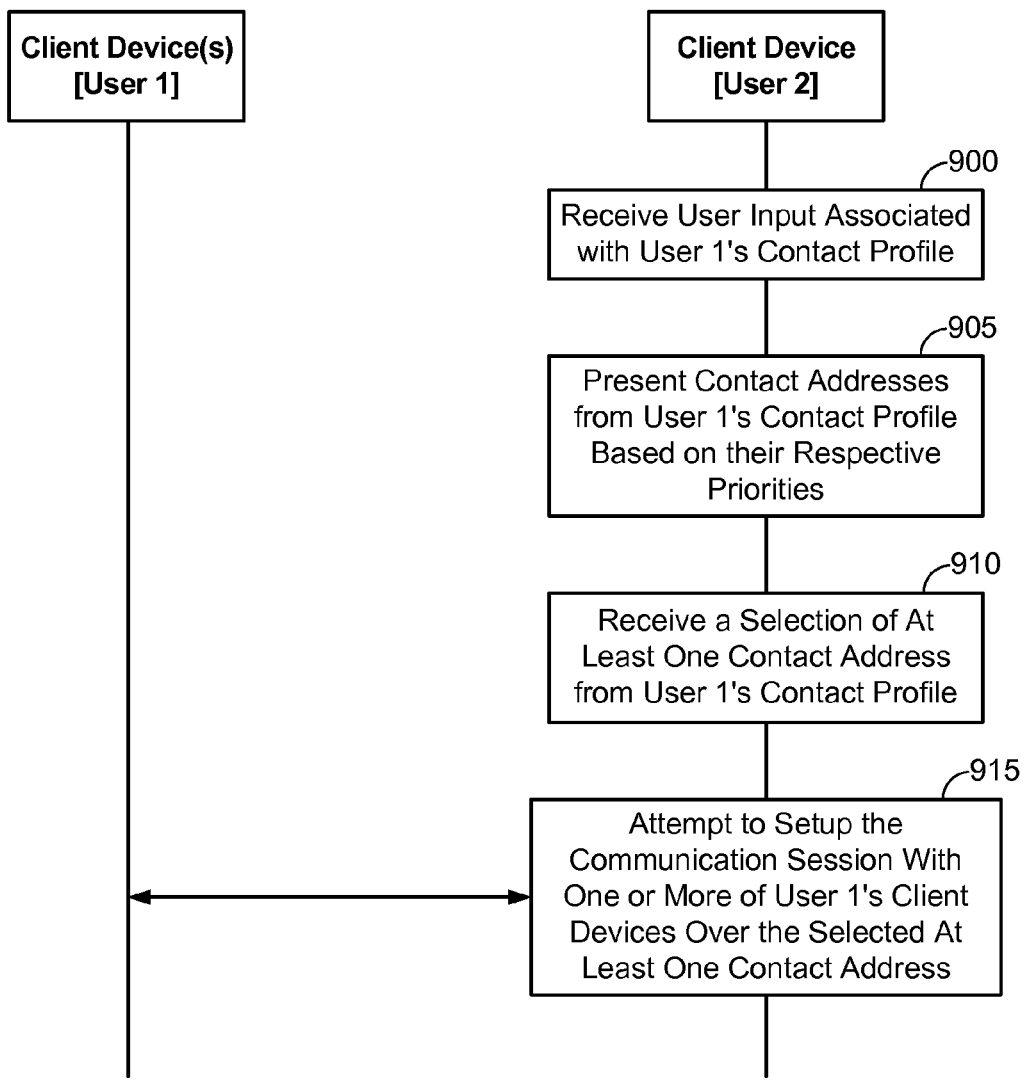
FIG. 9 illustrates a process of setting up a communication session in accordance with an embodiment of the present invention.

FIG. 9 illustrates a process of setting up a communication session in accordance with an embodiment of the present invention. In FIG. 9, assume that user 2's client is provisioned with a contact profile for user 1 based on a prior execution of FIG. 7 or FIG. 8.

Referring to FIG. 9, user 2's client device receives user input associated with user 1's contact profile, 900. For example, the user input at 900 can include user 2 navigating to user 1's contact profile with a contact book of user on the client device. User 2's client device then presents one or more contact addresses from user 1's contact profile based on their respective priorities, 905. For example, user 2's client device can present all contact addresses from user 1's contact profile with an online presence at 905. In another example, user 2's client device can present one or more of user 1's preferred contact addresses. In another example, assume that one of user 1's contact addresses is a Skype ID where the contact profile of user 1 has the Skype ID associated with more than one device (e.g., a smart phone, a tablet, a PC, a TV etc.). User 1 may be logged on to Skype on each of these multiple devices. In this case, Skype can create sub-addresses that map to specific devices, SkypeID.phone, SkypeID.tablet, SkypeID.PC, etc., and these identities could be included in the contact profile. User 2 can then select the target device he/she wishes to talk to, or presence information can be obtained so that user 2 is aware of which device user 1 is currently interacting with (if any).

Referring to FIG. 9, at 910, user 2's client device receives a selection of at least one of user 1's contact addresses, 910. For example, user 2 may select one particular contact address which can be used to contact user 1 on multiple client devices, user 2 may select each of user 1's contact addresses associated with a particular device location descriptor (e.g., home, work, etc.), user 2 may select a particular client device and all its associated contact addresses (e.g., to reach a particular device and not other devices that could also theoretically be reached using one or more of the same contact addresses, etc.), user 2 may select to reach a particular client device with one contact address for audio (e.g., cell phone number) and another contact address for video (e.g., Skype), etc. After receiving the selection of 910, user 2's client device attempts to setup the communication session with one of user 1's client devices over the selected at least one contact address, 915.

Further, a number of the embodiments described above refer to contact profiles and/or contact books that are maintained at least in part on client devices. It will be appreciated that these contact books can be maintained at least in part by the OS that is executing on the associated client device, or by a higher-layer third party client application that is executing on the associated client device, or a combination thereof. Thus, any type of contact book can be associated with the aforementioned procedures, and not merely the contact book maintained by the same client application responsible for managing the communication sessions that use or trigger changes to the contact book. In context with FIG. 7, this means that the contact book updates that occur at 730 and 745 does not necessarily need to be the contact book maintained by the same client application session that manages the communication session at 700 or 705 (although this is possible). In context with FIG. 9, this means that the contact book used to look-up user 1's contact address(es) at 900-910 does not need to be maintained by the same client application session that manages the communication session at 915 (although this is possible), and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating a server, comprising:
    maintaining a contact profile for a user, the contact profile including a universal identifier (UID) for the user and a list of devices through which to contact the user, each device in the list of devices being maintained in association with a device identifier, a device location descriptor and a set of contact addresses through which to contact the device;
    receiving a request from a remote client device to send the contact profile to the remote client device;
    determining a portion of the contact profile to send to the remote client device; and
    sending the portion of the contact profile to the remote client device.

2. The method of claim 1, wherein the UID corresponds to an email address, or a cellular phone number associated with a cellular phone from the list of devices.

3. The method of claim 1, wherein the device location descriptor includes home, work or mobile.

4. The method of claim 1, wherein maintaining a contact profile for a user comprises:
    registering an email address as the UID for the contact profile of the user;
    receiving, for a new device to be added to the contact profile, an indication of the UID and new device information that includes a given device identifier of the new device, a given device location descriptor of the new device and a given set of contact addresses through which to contact the new device; and
    updating the contact profile of the user to include the new device information in response to the new device information being received in association with the UID.

5. The method of claim 1, wherein maintaining a contact profile for a user includes:
registering an email address as the UID for the contact profile of the user;
receiving, for a new contact address to be added to the contact profile for an existing device that is already listed in the list of devices, an indication of the UID and new contact address information that includes a given device identifier of the existing device, wherein the new contact address corresponds to a given type of contact mechanism that is different from the registered email address; and
updating the contact profile of the user to include the new contact address for the existing device in response to the new contact address being received in association with the UID.

6. The method of claim 1, wherein the portion of the contact profile that is sent to the remote client device includes each of the set of contact addresses for each of the list of devices of the user.

7. The method of claim 1, wherein the portion of the contact profile that is sent to the remote client device includes less than all contact addresses from the set of contact addresses for one or more of the list of devices of the user.

8. The method of claim 1, wherein the request includes a token that indicates privileges of the remote client device with respect to the contact profile and determining the portion of the contact profile to send to the remote client device comprises determining the portion of the contact profile based on the token.

9. The method of claim 1, wherein determining the portion of the contact profile to send to the remote client device comprises determining the portion of the contact profile based upon one or more privacy rules associated with the user.

10. The method of claim 1, further comprising:
retrieving data messages associated with two or more different contact addresses from the contact profile, the two or more different contact addresses associated with different communication services; and
sending an aggregated version of the retrieved data messages associated with the two or more different contact addresses via a unified interface.

11. The method of claim 10,
wherein the retrieved data messages include a set of cellular phone voicemail messages and a set of Voice over Internet Protocol (VoIP) voicemail messages, and
wherein the two or more different contact addresses include a cellular phone number and a VoIP identifier.

12. The method of claim 10,
wherein the retrieved data messages include a set of email messages, and
wherein the two or more different contact addresses include two or more different email addresses.

13. The method of claim 1, wherein one or more contact addresses in the portion of the contact profile that is sent to the remote client device are masked so that the one or more contact addresses (i) can be recognized by software residing on the remote client device for communication session initiation attempts to the one or more contact addresses by the remote client device, and (ii) cannot be recognized by a given user of the remote client device.

14. The method of claim 1, wherein, for each device in the list of devices, the set of contact addresses includes either (i) a single contact address through which to contact the device, or (ii) multiple contact addresses through which to contact the device.

15. A server, comprising:
a processor configured with processor-executable instructions to perform operations comprising:
maintaining a contact profile for a user, the contact profile including a universal identifier (UID) for the user and a list of devices through which to contact the user, each device in the list of devices being maintained in association with a device identifier, a device location descriptor and a set of contact addresses through which to contact the device;
receiving a request from a remote client device to send the contact profile to the remote client device;
determining a portion of the contact profile to send to the remote client device; and
sending the portion of the contact profile to the remote client device.

16. The server of claim 15, wherein the UID corresponds to an email address, or a cellular phone number associated with a cellular phone from the list of devices.

17. The server of claim 15, wherein the device location descriptor includes home, work or mobile.

18. The server of claim 15, wherein the processor is further configured with processor-executable instructions to perform operations such that maintaining the contact profile comprises:
registering an email address as the UID for the contact profile of the user;
receiving, for a new device to be added to the contact profile, an indication of the UID and new device information that includes a given device identifier of the new device, a given device location descriptor of the new device and a given set of contact addresses through which to contact the new device; and
updating the contact profile of the user to include the new device information in response to the new device information being received in association with the UID.

19. The server of claim 15, wherein the processor is further configured with processor-executable instructions to perform operations such that maintaining the contact profile comprises:
registering an email address as the UID for the contact profile of the user;
receiving, for a new contact address to be added to the contact profile for an existing device that is already listed in the list of devices, an indication of the UID and new contact address information that includes a given device identifier of the existing device, wherein the new contact address corresponds to a given type of contact mechanism that is different from the registered email address; and
updating the contact profile of the user to include the new contact address for the existing device in response to the new contact address being received in association with the UID.

20. The server of claim 15, wherein the processor is further configured with processor-executable instructions to perform operations such that the portion of the contact profile that is sent to the remote client device includes each of the set of contact addresses for each of the list of devices of the user.

21. The server of claim 15, wherein the processor is further configured with processor-executable instructions to perform operations such that the portion of the contact profile that is sent to the remote client device includes less than all contact addresses from the set of contact addresses for one or more of the list of devices of the user.

22. The server of claim 15, wherein the request includes a token that indicates privileges of the remote client device with respect to the contact profile, and wherein the processor is further configured with processor-executable instructions to perform operations such that determining the portion of the contact profile to send to the remote client device comprises determining the portion of the contact profile based on the token.

23. The server of claim 15, wherein the processor is further configured with processor-executable instructions to perform operations such that determining the portion of the contact profile to send to the remote client device comprises determining the portion of the contact profile based upon one or more privacy rules associated with the user.

24. The server of claim 15, wherein the processor is further configured with processor-executable instructions to perform operations comprising:
retrieving data messages associated with two or more different contact addresses from the contact profile, the two or more different contact addresses associated with different communication services; and
sending an aggregated version of the retrieved data messages associated with the two or more different contact addresses to the user.

25. The server of claim 24,
wherein the retrieved data messages include a set of cellular phone voicemail messages and a set of Voice over Internet Protocol (VoIP) voicemail messages, and
wherein the two or more different contact addresses include a cellular phone number and a VoIP identifier.

26. The server of claim 24,
wherein the retrieved data messages include a set of email messages, and
wherein the two or more different contact addresses include two or more different email addresses.

27. The server of claim 15, wherein the processor is further configured with processor-executable instructions to perform operations such that one or more contact addresses in the portion of the contact profile that is sent to the remote client device are masked so that the one or more contact addresses (i) can be recognized by software residing on the remote client device for communication session initiation attempts to the one or more contact addresses by the remote client device, and (ii) cannot be recognized by a given user of the remote client device.

28. The server of claim 15, wherein the processor is further configured with processor-executable instructions to perform operations such that, for each device in the list of devices, the set of contact addresses includes either (i) a single contact address through which to contact the device, or (ii) multiple contact addresses through which to contact the device.

29. A server, comprising:
means for maintaining a contact profile for a user, the contact profile including a universal identifier (UID) for the user and a list of devices through which to contact the user, each device in the list of devices being maintained in association with a device identifier, a device location descriptor and a set of contact addresses through which to contact the device;
means for receiving a request from a remote client device to send the contact profile to the remote client device;
means for determining a portion of the contact profile to send to the remote client device; and
means for sending the portion of the contact profile to the remote client device.

30. A non-transitory computer-readable medium containing instructions stored thereon, which, when executed by a server, cause the server to perform operations, the instructions comprising:
at least one instruction to cause the server to maintain a contact profile for a user, the contact profile including a universal identifier (UID) for the user and a list of devices through which to contact the user, each device in the list of devices being maintained in association with a device identifier, a device location descriptor and a set of contact addresses through which to contact the device;
at least one instruction to cause the server to receive a request from a remote client device to send the contact profile to the remote client device;
at least one instruction to cause the server to determine a portion of the contact profile to send to the remote client device; and
at least one instruction to cause the server to send the portion of the contact profile to the remote client device.

* * * * *